United States Patent [19]

Cairns et al.

[11] 4,397,770

[45] * Aug. 9, 1983

[54] METHOD OF PREPARING A CATALYST

[75] Inventors: James A. Cairns, Wantage; James L. Woodhead, Didcot; John D. F. Ramsay, Abingdon, all of England

[73] Assignee: United Kingdom Atomic Energy Authority, London, England

[*] Notice: The portion of the term of this patent subsequent to Jan. 9, 1996, has been disclaimed.

[21] Appl. No.: 733,152

[22] Filed: Oct. 18, 1976

[30] Foreign Application Priority Data

Oct. 22, 1975 [GB] United Kingdom ............... 43435/75

[51] Int. Cl.³ .................. B01J 21/04; B01J 23/40
[52] U.S. Cl. .................. 252/465; 252/463; 252/466 PT; 252/466 J; 252/472; 423/213.5
[58] Field of Search ............... 252/463, 465, 466 PT, 252/472, 449, 454, 466 J; 423/213.2, 213.5

[56] References Cited

U.S. PATENT DOCUMENTS

| 3,899,444 | 8/1975 | Stephens | 423/213.5 |
| 3,920,583 | 11/1975 | Pugh | 252/466 PT |
| 3,944,504 | 3/1976 | Ford et al. | 252/466 PT |
| 4,006,103 | 2/1977 | Meguerian et al. | 423/213.5 |

*Primary Examiner*—W. J. Shine
*Attorney, Agent, or Firm*—William R. Hinds

[57] ABSTRACT

A catalyst suitable for use in the treatment of motor vehicle exhaust emissions is made by contacting a substrate, preferably of an aluminium bearing ferritic alloy, with a first sol of refractory material followed by drying and firing, and preferably then contacting with a second sol of refractory material, which additionally contains a salt convertible to catalytic material, followed by drying and firing. The sols are obtained from refractory material, e.g., alumina, made by a vapor phase condensation method.

17 Claims, No Drawings

METHOD OF PREPARING A CATALYST

This invention relates to catalysts and their preparation, and also to colloidal dispersions and their preparation.

There has been much interest in the use of catalysts for the treatment of motor vehicle exhaust gases in order to eliminate the noxious constituents thereof. Such use, however, makes heavy demands on the catalyst, which has to withstand a severe environment and repeated thermal cycling throughout its working lifetime whilst retaining catalytic effectiveness.

We have now prepared a catalyst which may meet the above requirements and which may have applications in fields other than the treatment of motor vehicle exhaust gases.

Thus, the present invention provides, in a first aspect, a method of preparing a catalyst comprising a substrate carrying refractory material, which method comprises the steps of (i) contacting a substrate with a first dispersion comprising colloidal particles of refractory material in a liquid medium, which refractory material has been prepared by a vapour phase condensation method, and (ii) drying and firing to produce a coating of the refractory material on the substrate.

The catalyst so prepared may be used as a catalyst in its own right provided that the refractory material is catalytically active, or, preferably it may be used as a support wherein the refractory material carries catalytically active material as additional material, in which case the refractory material may or may not itself be catalytically active. Preferably, the catalytically active material, as additional material, is applied by contacting the product of step (ii) with a second dispersion in a liquid medium comprising colloidal particles of a refractory material which has been prepared by a vapour phase condensation method, and comprising material which is catalytically active or is convertible to catalytically active material, and by converting the convertible material, if present, to catalytically active material. In this preferment, the catalytically active material is different from the refractory material.

The catalysts of the present invention may be capable of catalyzing both oxidation and reduction reactions. Thus, they may, for example, have particular application in the treatment of exhaust fumes from internal combustion engines where they have exhibited remarkable ability to withstand repeated thermal cycling, and also, for example, have applications in hydrogenation, gas burners, isomerisation and ignition systems.

The particular stability of the catalysts of the present invention is believed to be attributable, at least in part, to the fact that the refractory material has been prepared by a vapour phase condensation method. Such methods generally give products of high surface area (referred to as primary-particles), which are capable of dispersion in a liquid medium to give colloidal particles comprising loose aggregate structures of the primary-particles, in which aggregates there are point to point contacts between the primary particles in the structure and spaces within the aggregate structure. Also, the number of point to point contacts is low because of the loose nature of the structure. The morphology of the colloidal particles provides particular advantages in the context of the present invention in that the above mentioned contacts in the aggregate structure present very few opportunities for sintering in the final catalyst, which, if it took place, would reduce surface area and hence catalytic activity. This is in contrast to a catalyst prepared from a boehmite sol, for example, wherein the refractory material, i.e., alumina comprises aggregates of crystallites having flat faces with face to face contacts between adjacent crystallites and which therefore present far greater opportunities for sintering.

By a vapour phase condensation method is meant a preparative method which passes through a vapour phase intermediate. Examples of vapour phase condensation methods are flame hydrolysis of volatile halides or alkoxides, evaporation and condensation methods using electron beam, D.C. arc or R.F. plasma heating, or metal oxidation (e.g. of Mg) to give a smoke which is then condensed. A specific example of such a method is the production of alumina by the hydrolytic decomposition of a corresponding volatile halide in a flame to give a product with substantially spherical primary-particles. Oxides produced in this way may, for example, have a particle diameter in the range 4 to 50 nm and a particular example is a finely divided alumina having a particle diameter of $\sim 10$ nm and a surface area of $\sim 100$ m$^2$/g.

Primary-particles prepared in this way may be dispersed in a suitable liquid medium to give a sol constituting the first dispersion as used in the present invention. For example, the abovementioned $Al_2O_3$ may readily be dispersed in water to give a stable alumina aquasol, wherein the colloidal particles comprise loose aggregates of substantially spherical primary particles and are in the form of $\eta$-$Al_2O_3$ which is a catalytically active form of alumina.

In this context, it should be noted that $\eta$-alumina is considered to have a defective lattice (see, for example, B. C. Lippens, "The Structure and texture of aluminas", p. 78, Ph.D. Thesis, Delft, 1961) of a type in common with other aluminas which include those generally referred to as $\gamma$-aluminas; $\eta$-alumina, in this specification, is to be taken to include such transition aluminas. It should be further noted that where $\eta$-alumina constitutes the refractory material in the dispersions used in the present method, the firing steps may cause the form of the alumina to change; therefore the alumina in the final catalyst is not necessarily $\eta$-alumina.

A further advantage is provided in the abovementioned specific case in that the alumina in the colloidal particles is in a non-hydrated form. Water is present only at the surfaces of the primary-particles. Thus, when the colloidal particles are heated to produce a catalyst as in the present method, there is little risk of collapse of their structure and subsequent loss of surface area on removal of water. This contrasts with the case if a boehmite sol were used. Thus, boehmite is a hydrated alumina (AlO.OH) where chemically combined water is present within the colloidal particles. Heating of these particles results in loss of this water and subsequent collapse of the structure and loss of surface area. We have conducted experiments which clearly show the thermal stability of the aluminas usable in the present invention and which show their superiority in this respect over boehmite.

Clearly, the product of the vapour phase condensation method must be selected for its dispersibility in a liquid medium to give a dispersion useful in the present method. In this context, we have some evidence to indicate that the dispersibility of the above-mentioned alumina in water may be due to the presence of small quantities of chloride ion derived from its method of preparation.

In some cases, it may be advantageous to prepare the colloidal particles in each of the first and second dispersions by dispersing primary-particles of the refractory material in the liquid medium, producing gel particles therefrom, e.g., by spray drying, and redispersing the gel particles. The gel particles may have advantages over the primary-particles in being much more dense and easier to handle. Also, we have some evidence to suggest that there may be an improvement in the performance of the final catalyst when the colloidal particles have been prepared in this way.

In the first dispersion and also in the second dispersion, the colloidal particles dispersed in the liquid medium, which is most conveniently water, constitute a sol. We prefer that the refractory material in each dispersion is a refractory oxide, examples of which are alumina (which has already been mentioned and is highly preferred), beryllia, zirconia, thoria and silica and also combinations of oxides. Preferred oxides are those of an element whose atomic number does not exceed 40.

The term "refractory material" applied to the colloidal particles in the first or second dispersions may also include a precursor thereof which is convertible to refractory material either at some stage in the preparation of the catalyst or possibly during use thereof.

The catalytically active material may, for example, be a noble metal and is preferably a platinum group metal, namely osmium, iridium, platinum, palladium, rhodium or ruthenium, when it may be comprised of more than one platinum group metal.

In the second dispersion, the catalytically active material or convertible material is preferably dispersed in the liquid medium in the form of a solution therein. We prefer to use convertible material in the form of water soluble inorganic salt or salts of platinum group metals, dissolved in water as the liquid medium. Examples of such salts are salts of platinum group metals such as chloroplatinic acid and rhodium tri-chloride which are readily converted to the metal by, for example, chemical or thermal reduction. The conversion of convertible material to catalytically active material may then be carried out by calcining, which may also convert gel which is present to a ceramic form and also convert any precursors as mentioned herein to their final form.

We prefer, however, to effect the conversion to catalytically active material by reduction using a soluble carbonisable polymer. 'Soluble' means soluble in the liquid medium, and the polymer is provided in solution in the second dispersion so that it is transferred to the substrate together with the refractory material, and the convertible material. On calcining, the polymer is initially carbonised and then reduction of convertible material to catalytically active material effected by carbon and/or carbon monoxide. For such a mode to be effective, the convertible material must, of course, be capable of being reduced in this way. Examples of such polymers are natural agents such as dextrans, which are polyglucoses in which the majority of the bonds linking the sugar units are of the 1:6-α type, and may be synthesised from sucrose by micro-organisms; starches, including chemically modified starches such as starch ethers, acetylated starches and dextrins; cellulose derivatives such as methyl cellulose and hydroxyethyl cellulose (the carboxymethylcelluloses are of only limited application since they tend to gel with certain inorganic salt solutions which may be used in the present method); polysaccharides such as sucrose, frutose and invert sugar; gums, including chemically modified gums, and synthetic agents such as polyvinyl alcohol and related compounds. Polyvinyl alcohol, which hereafter may be referred to as PVA, refers to the water soluble products obtained by the complete or partial hydrolysis or alcoholysis of polyvinyl esters such as polyvinyl acetate.

It may be necessary to carry out a calcining step when using the second dispersion even in cases where convertible material is not present. The purpose of such calcining may, for example, be for converting the gel of the support material to a ceramic form, for improving adhesion of the refractory material to the substrate, or for converting any precursors to their final form.

A grain growth inhibitor may also be included in each of the first dispersion and, if used, the second dispersion. By "grain growth inhibitor" is meant a substance which inhibits the grain growth of the refractory material when the latter is subjected to heat treatment. This is of particular significance in the context of the use of a catalyst since the inhibitor reduces sintering of the refractory material during high temperature use of the catalyst and thereby reduces loss of surface area of the refractory material and hence loss of catalytic activity.

The grain growth inhibitor in the dispersions in the present method may be a grain growth inhibitor as such or a precursor thereof which is convertible to an inhibitor as such at some step in the preparation of the catalyst or possibly during use of the catalyst.

The grain growth inhibitor is different from the refractory material and is preferably a compound of a Group IIIA metal or of a rare earth metal, for example a salt thereof which is soluble in the liquid medium, and which is provided in solution in the liquid medium in the first and/or second dispersions. Such salts may associate in some way with the colloidal particles in the dispersions, possibly by electrostatic attraction, to give what may be termed a "mixed sol". A specific example of such a mixed sol comprises an alumina aquasol in which yttrium nitrate is dissolved. The $Al_2O_3$ is the refractory material and yttrium nitrate, which is a precursor of yttria, the inhibitor. Alternatively, the inhibitor may be in the form of colloidal particles dispersed in the liquid medium.

We have found that the proportion of inhibitor to refractory material (by weight) is significant. Best results have been achieved using around 0.1% (by weight) of inhibitor. Results have, however, been less good when larger proportions by weight of inhibitor (e.g., 0.5% and greater) were used.

Thus, we have carried out experiments on catalysts prepared by using up to 5% $Y_2O_3/Al_2O_3$ (by weight) and, where the $Y_2O_3$ was obtained by calcining yttrium nitrate. We found that best results, in terms of final performance of the catalyst, were achieved using about 0.1% $Y_2O_3/Al_2O_3$ (by weight) and that the stability of the final catalyst was outstanding, even after subjection to repeated thermal cycling.

The first dispersion and, if used, the second dispersion may be prepared by simple admixture of the required constituents. Thus, in a specific example of preparing the first dispersion, $Al_2O_3$, prepared by flame hydrolysis, may be dispersed in water to give an $Al_2O_3$ aquasol and an aqueous solution of yttrium nitrate mixed therewith. To prepare a specific example of the second dispersion, chloroplatinic acid may be dissolved in a sample of the above first dispersion.

The contacting of the substrate with the first dispersion is to transfer the colloidal particles (plus the grain growth inhibitor, if present) onto the substrate. Likewise, contacting with the second dispersion, if carried out, is to transfer the colloidal particles, and catalytic or convertible material (plus grain growth inhibitor, if present) onto the substrate.

The substrate used in the present method may be in the form of a powder, a sheet, including a combination of plane and corrugated sheets as in a honeycomb structure, fibre, or a gauze. The contacting of the substrate with the dispersions may be carried out by simple immersion of the substrate therein followed by removal. This procedure is particularly appropriate when the substrate is in the form of a sheet. The drying step removes the liquid medium and converts the sol to the corresponding gel form on the substrate surface.

Another way of contacting the substrate with the dispersions, which is particularly appropriate when the substrate is in the form of small spheres, granules or a powder, is to include the substrate in the first dispersion and then to remove the liquid mediium, for example, by heating.

Examples of substrates which may be used include metallic substrates such as aluminium bearing ferritic alloys, for example an alloy of iron, chromium, aluminium and yttrium, a particular example of which is the alloy with proportion by weight lying in the range of up to 20% Cr, 0.5 to 12% Al, 0.1 to 3% Y, and the balance iron. An aluminium bearing ferritic alloy is preferably used oxidised when it has the property of forming an essentially alumina surface layer which acts as a "key" for the refractory material and catalytically active material which may be applied by the present method.

Non-metallic substrates such as ceramics (e.g. alumina, kaolin, mullite, zirconia, silica) may also be used, provided they can withstand the conditions of the firing step(s).

The firing in step (ii) may conveniently be carried out at a temperature within the range from 200° C. to 850° C.

We have also found that a catalyst, for example, in the form of a powder, may be produced from the above-mentioned second dispersion by removing the liquid medium and converting convertible material, if present, to catalytically active material. This may be done, for example by boiling to dryness.

Thus, in a second aspect, the present invention provides a method of preparing a catalyst which comprises the steps of (i) providing, in a liquid medium, a dispersion comprising colloidal particles of a refractory material, which has been made by a vapour phase condensation method, and comprising material which is catalytically active or is convertible to catalytically active material; and (ii) removing the liquid medium and converting the convertible material, if present, to catalytically active material thereby to produce the catalyst.

In a third aspect, this invention includes a catalyst made by any of the methods of the present invention.

In a fourth aspect, the present invention provides a catalyst comprising a substrate carrying alumina whose specific surface area at a temperature below 1100° C. is not less than 70 $m^2g^{-1}$ and whose total pore volume at a temperature below 1100° C. is not less than 0.50 $dm^3kg^{-1}$, which alumina preferably carries catalytically active material and in a fifth aspect, the present invention provides a catalyst wherein alumina as defined in the fourth aspect carries catalytically active material.

In a fourth and fifth aspects of the invention, we prefer that the specific surface area of the alumina at a temperature below 1100° C. falls within the range from 70 $m^2g^{-1}$ to 100 $m^2g^{-1}$ and whose total pore volume at a temperature below 1100° C. falls within the range from 0.50 $dm^3kg^{-1}$ to 0.85 $dm^3kg^{-1}$. It is to be noted that the discussion herein of substrate, catalytically active material and provision of grain growth inhibitor applies also to the fourth and fifth aspects of the invention.

The invention will now be particularly described in the following examples; the "Fecralloy" (Registered Trade Mark) alloy used therein contained up to 20% Cr, 0.5 to 12% Al, 0.1 to 3% Y, and the balance Fe (all proportions by weight). The examples also include comparative experiments which were carried out to compare the thermal stability of aluminas usable in the present invention with boehmite.

EXAMPLE 1

Finely powdered alumina, having a small particle size (~10 nm) and high surface area (~100 $m^2/g$) was dispersed in water to give a sol containing 160 g/l $Al_2O_3$. Yttrium nitrate was dissolved in water to form a solution containing 170 g/l $Y_2O_3$ equivalent.

Preparation of Dispersion

The above sol and the above solution were mixed in proportions to give a "mixed sol" having the composition: $Al_2O_3$: 91.5 g/l; $Y_2O_3$ equivalent: 0.46 g/l; $NO_3^-$: 0.75 g/l; mol ratio $NO_3/Al+Y$: 0.006 (i.e. 0.5% $Y_2O_3/Al_2O_3$). The mixed sol (referred to as the first dispersion) was observed to be stable.

Polyvinyl alcohol was then dissolved in a sample of the mixed sol and also chloroplatinic acid to give 15.15 g/l of $H_2PtCl_6$ (≡6.06 g Pt) and 0.61 g/l of PVA. The dispersion produced (referred to as the second dispersion) was a stable coloured dispersion.

Preparation of Substrate

A sample of "Fecralloy" alloy of thickness $6.25 \times 10^{-3}$ cm was heated in air for a few hours at 1000° C. to form an alumina rich surface layer. The oxidised alloy was then immersed in a sample of the above first dispersion (i.e. lacking the $H_2PtCl_6$ and PVA) removed, dried and fired at 850° C. for ~15 minutes.

Preparation of Catalyst

The substrate, prepared as above, was immersed in the second dispersion, prepared as above, removed, dried and fired in air at 850° C. for 15 minutes. The firing carbonised the PVA, and the chloroplatinic acid was reduced to platinum which appeared as a dark sheen on the surface of the substrate.

Tests on Catalyst

The catalyst was tested under conditions designed to simulate the high gaseous throughputs which obtain in a vehicle exhaust environment.

A sample of the catalyst measuring 2×2 cm and of thickness $6.25.10^{-3}$ was mounted in a silicon tube and subjected to 50 μl slugs of either carbon monoxide/oxygen or propane/oxygen, flowing at a velocity of 50 ml/min, i.e. the space velocity of the gases was equivalent to the volume of the catalyst being displaced 120,000 times per hour, which is near to the upper limit of a typical exhaust system. The temperature required to cause complete conversion of the noxious components was noted. The catalyst was then subjected to an accelerated ageing procedure by being heated in air at 1,000° C. for 8 hours, and the above measurement repeated. The results appear in Table 1 below.

EXAMPLES 2-4

The procedure of Example 1 was repeated using different proportions of $Y_2O_3$ equivalent in the first and second dispersions. The results, together with the results for Example 1 are summarised in Table 1 below.

| Example | $Y_2O_3/Al_2O_3$ Wt % | Complete Conversion Temperature (°C.) | | | |
|---|---|---|---|---|---|
| | | New Catalyst | | After Heating at 1000° C. in air for 8 hours | |
| | | CO | Propane | CO | Propane |
| 2 | 0.1% | 250 | 300 | 250 | 300 |
| 1 | 0.5% | 275 | 400 | 315 | 450 |
| 3 | 1% | 260 | 300 | 310 | 350 |
| 4 | 5% | 240 | 300 | 280 | 400 |

The above results show that the catalyst produced in Example 2 is preferred. Accordingly, this catalyst was subjected to additional tests as follows. A sample of the catalyst made from corrugated "Fecralloy" steel sheet was fabricated into a cylindrical vehicle exhaust catalyst (4" diameter × 6" length). This was mounted on the exhaust system of a 2 liter petrol engine (Triumph Dolomite), running on low lead (0.034 gm/US gal) fuel. The engine was cycled between idle and 70 mph road load at 1 minute intervals for a prescribed number of hours.

The catalyst was then removed, mounted on the exhaust system of a 1.8 liter Austin Marina car and used to control the emissions over the standard USA Environmental Protection Agency driving cycle, the emission being measured by a Constant Volume Sampling (CVS) technique. The results exhibited by the catalyst after running on the test bed for various intervals up to 600 hours (which can be considered as equivalent to approximately 50,000 miles on the road) are summarised in Table II below.

TABLE II

Exhaust Emissions from Austin Marina Car, as measured by Constant Volume Sampling (CVS) Technique, using Catalyst after Durability Running on Engine Test Bed

| | Hydrocarbons (gm/mile) | Carbon Monoxide (gm/mile) |
|---|---|---|
| Baseline (i.e. Without Catalyst) | 0.70 | 14.21 |
| No. of Hours on Test Bed | | |
| zero | 0.07 | 0.70 |
| 50 | 0.17 | 0.50 |
| 100 | 0.21 | 0.95 |
| 200 | 0.22 | 0.83 |
| 300 | 0.27 | 0.83 |
| 400 | 0.26 | 0.89 |
| 500 | 0.20 | 1.30 |
| 600 | 0.29 | 1.66 |
| Allowed Emission Limits | 0.41 | 3.4 |

It may be seen from this that the catalyst was still containing the emission to well within the allowed limits, even after this prolonged durability exposure.

EXAMPLE 5

The procedure of Example 1 was repeated, but with the omission of the yttrium nitrate from the first and second dispersions.

The tests on the catalyst give the following results

| Complete Conversion Temperature (°C.) | | | |
|---|---|---|---|
| New Catalyst | | After Heating at 1000° C. in air for 8 hours | |
| CO | Propane | CO | Propane |
| 240 | 300 | 310 | 350 |

EXAMPLE 6
Thermal Stability of Various Aluminas

Samples of alumina gel were prepared from sols such as those used in Examples 1 to 5 and their surface and porous properties measured. The properties were also measured after calcining for 2 hours in air at various temperatures. The experiments were carried out on pure alumina (Gel A) gels and on gels containing yttria in addition to alumina (Gel B). For comparison purposes, similar experiments were carried out on samples of boehmite (hydrated alumina) gel. The results are summarised in the table below.

| Calcination temp/°C. | Specific surface area $S_{BET}/m^2 g^{-1}$ | | | Total pore volume $V_p/dm3 kg^{-1}$ | | |
|---|---|---|---|---|---|---|
| | Boehmite | Gel A | Gel B | Boehmite | Gel A | Gel B |
| Uncalcined | 194 | 101 | | 0.22 | 0.77 | |
| 800 | 138 | 89 | | 0.28 | 0.81 | |
| 1000 | 93 | 93 | | 0.25 | 0.78 | |
| 1050 | 77 | | | 0.27 | | |
| 1100 | <<10 | 74 | 72 | | 0.66 | 0.56 |
| 1150 | | ca 10 | ca 10 | | | |
| 1200 | | <<10 | <<10 | | | |

The yttria containing gels contained 0.2% $Y_2O_3$ weight per weight.

The results in the table demonstrate clearly the enhanced thermal stability of gels A and B compared with the boehmite gel.

We claim:

1. A method of preparing a catalyst comprising a substrate carrying refractory material which method comprises the steps of
   (i) contacting a substrate with a dispersion comprising colloidal particles of refractory material in a liquid medium, which refractory material has been prepared by a vapour phase condensation method, and
   (ii) drying and firing to produce a coating of the refractory material on the substrate.

2. A method according to claim 1 wherein catalytically active material is also applied to the substrate.

3. A method according to claim 2 wherein the catalytically active material is applied by contacting the product of step (ii) with a second dispersion in a liquid medium comprising colloidal particles of a refractory material, which has been prepared by a vapour phase condensation method, and comprising material which is catalytically active or is convertible to catalytically active material, and by converting the convertible material, if present, to catalytically active material.

4. A method according to claim 3 wherein convertible material is used and comprises a water-soluble salt of a platinum group metal in solution in water as the liquid medium.

5. A method according to claim 4 wherein the second dispersion additionally contains, dissolved therein, a water-soluble carbonisable polymer and wherein the conversion of the salt to catalytic material is effected by firing whereby the polymer is carbonised and the salt reduced to catalytic material.

6. A method according to claim 5 wherein the refractory material is alumina.

7. A method according to claim 6 wherein each of the first and second dispersions contains a grain growth inhibitor for the alumina.

8. A method according to claim 7 wherein the grain growth inhibitor is yttria.

9. A method according to claim 3 wherein the substrate comprises an aluminium-bearing ferritic alloy.

10. A method according to claim 9 wherein the alloy is an alloy of iron, aluminium, chromium and yttrium.

11. A method according to claim 10 wherein the alloy contains up to 20% chromium, 0.5 to 12% aluminium, 0.1 to 3% yttrium, and the balance iron, wherein the percentages are by weight.

12. A method according to claim 11 wherein the alloy used carries an essentially alumina surface layer, formed by oxidation of the alloy.

13. A method of preparing a catalyst comprising the steps of (i) dispersing alumina in the form of substantially spherical primary-particles, prepared by a vapour phase condensation method, in water to give a sol;
(ii) contacting said sol with an aluminium-bearing ferritic alloy which carries an essentially alumina surface layer, formed by oxidation of the alloy,
(iii) drying and firing,
(iv) dispersing alumina in the form of substantially spherical primary-particles prepared by a vapour phase condensation method in water to give a sol and providing in solution in the water a water-soluble salt of a platinum group metal and a water-soluble carbonisable polymer,
(v) contacting the product of step (iii) with the sol of step (iv),
(vi) drying and firing to reduce the salt to a platinum group metal and thereby produce the final catalyst.

14. A method according to claim 13 wherein there is provided, dissolved in the water in each of steps (i) and (iv), a water-soluble ytrrium salt which is convertible to yttria on firing.

15. A method according to claim 14 wherein the aluminium-bearing ferritic alloy is an alloy of iron, aluminium, chromium, and yttrium.

16. A method according to claim 15, wherein the alloy contains up to 20% chromium, 0.5 to 12% aluminium, 0.1 to 3% yttrium, and the balance iron, wherein the percentages are by weight.

17. A method according to claim 1 wherein said dispersion includes material which is catalytically active or is convertible to catalytically active material by step (ii).

* * * * *